Aug. 9, 1938.  M. KOHOSOFF  2,126,399
SOLDERING DEVICE
Filed May 5, 1937

Matthew Kohosoff,
INVENTOR.
BY
ATTORNEY.

Patented Aug. 9, 1938

2,126,399

UNITED STATES PATENT OFFICE 2,126,399

SOLDERING DEVICE

Matthew Kohosoff, New York, N. Y.

Application May 5, 1937, Serial No. 140,823

3 Claims. (Cl. 126—240)

The invention relates to soldering or tinning devices of the type in which a container is employed for holding a quantity of melted solder and in which the objects to be soldered or tinned are dipped. The invention has for its main object to provide a soldering device of safe construction which will effectively remove any danger of causing fires or the dropping of solder on floors or other objects.

Another object is to provide a device of this type which may be used in places otherwise quite inaccessible and which can be tilted to various angles without any danger of spilling the solder. A further object is to so construct the device that it may be used on a bench or carried from place to place, as the job being done may warrant. A still further object is to provide a device of this type in which a quantity of the fuel used for heating the solder may be stored, and in which containers for the solder, of various sizes and shapes, may be readily substituted one for another.

Additional objects are to provide a soldering device of simple construction, which can be used both in and outdoors, in which the temperature of the solder can be maintained at an even degree of heat, which is light in weight, easy to operate, and the use of which requires no particular skill on the part of the operator.

These and various other objects and advantages will be readily understood from the following description and from the accompanying drawing of preferred embodiments of the invention, in which, however, modifications may be made without departing from the scope of the appended claims. In the drawing, Fig. 1 is a side elevation of the soldering device, shown with certain parts broken away;

Figure 1:
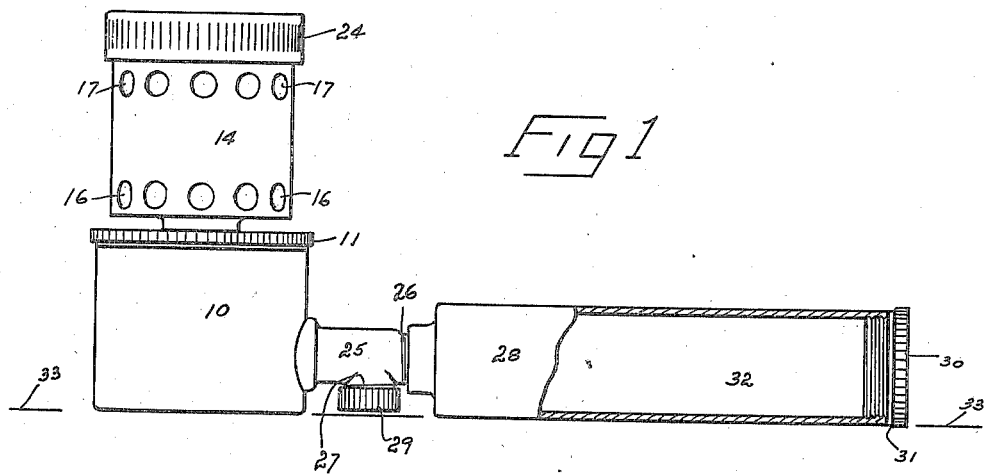
Figure 2:
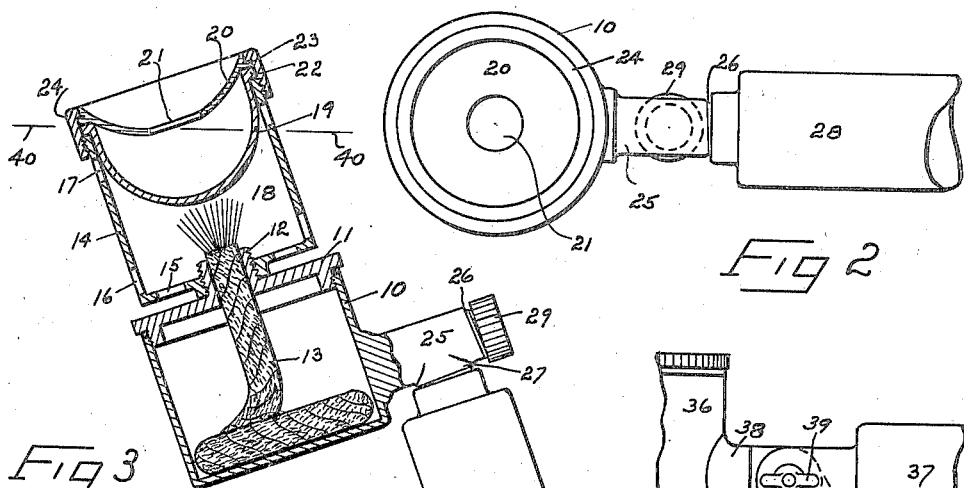
Fig. 2 is a fragmental, top view of Fig. 1.
Figure 3:
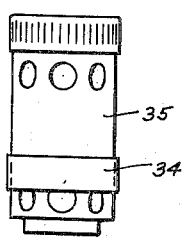
Fig. 3 is a side elevation, shown partly in cross section and with the handle arranged in a different position.

Referring now to Figs. 1, 2 and 3, the device consists of a fuel container 10 adapted to rest on a flat surface. A cover 11 is preferably threaded into the upper end of the fuel container and this cover is provided with a threaded stud 12 through which a wick 13 is extended. A support 14 is mounted on the threaded stud 12 and provided with a number of orifices 15, 16 and 17 so as to cause air currents to be drawn through the combustion chamber 18 formed in the support when a quantity of suitable liquid fuel, as for example alcohol, is placed in the fuel container and the wick is lit. A solder pot 19 is held in the support and on top of this solder pot, a concave cover or guard 20 is placed. This cover has a central opening 21. The solder pot is provided with a circumferential flange 22 and the guard with a circumferential flange 23, as plainly shown in Fig. 3. These flanges rest on top of the support, and the pot as well as the guard is clamped to the support by means of a threaded cap 24.

A stud 25 is preferably formed integrally with the fuel container and provided with two threaded parts 26 and 27, to either one of which a handle member 28 may be secured. As shown in Fig. 1, the handle member is secured to the threaded part 26, while a cap 29 is threaded on the member 27. The thread in this cap is preferably made to fit the threaded stud 12 so that, when the device is not in use, the support 14 may be removed and the cap 29 threaded on the stud 12 so as to prevent evaporation of the fuel in the fuel container. The handle member 28 is preferably made hollow and closed by means of a threaded cap 20 and a gasket 31 so that the recess 32 thus formed in the handle may be used for storing a quantity of fuel for use in the device.

The device is employed in the following manner: It may be placed on a bench or other surface and for this reason the handle member 28 is so arranged in relation to the fuel chamber that it will rest on a flat surface, as indicated by the line 33. Its principal use is for tinning electric wires and other electric appliances used in wiring. The wires to be tinned are stripped in the usual manner and, after a flux has been applied, they are merely dipped into the pot through the opening 21 in the guard. As the guard is preferably made of a predetermined height above the bottom of the solder pot, all wires thus dipped will be tinned for a certain distance.

When wires in outlet boxes or other appliances are to be tinned, the device is carried right to the boxes and raised so that the wires will be dipped in the pot in the manner just described. To make it easier to reach such outlet boxes, whether located on the walls or on the ceiling, the handle member 28 may be employed as shown in Fig. 1, so as to be at right angle with the solder pot, or it may be attached as shown in Fig. 3, so as to be parallel with the solder pot. By securing the cap 29 on the unoccupied threaded member, the danger of losing this cap is greatly minimized.

Figure 4:
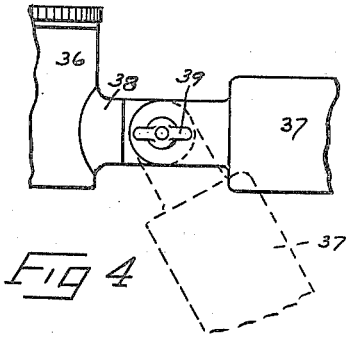
Fig. 4 is a fragmental, side view showing a modification of the handle construction.
Figure 5:
Fig. 5 is a side elevation of a slightly modified solder container.

It is evident that solder pots of various sizes and shapes may be used as for example the small embodiment shown in Fig. 5. This is particularly well suited for small outlet boxes. To regulate the heat of the solder I preferably place a slidable ring 34 on the outside of the support 35 so that the area of the air passages may be altered to increase or decrease the amount of air passing through the combustion chamber. While I prefer to construct the handle as shown in Figs. 1, 2 and 3, the handle may be swiveled as shown in Fig. 4. In this view the fuel container is indicated at 36 and the handle at 37. The handle member may be turned as shown and is secured to the stud 38 by means of a wing nut 39.

From the foregoing it will be seen that this device may find many uses, particularly in the electric wiring business; that its construction eliminates all danger of fire hazards; that it can be tilted to quite an angular position, as indicated by the line 40 in Fig. 3 without any danger of the solder being spilled; and that it effectively prevents the dropping of solder as is so common with many devices now in use.

Having described the invention and its objects, what I claim as new and wish to protect by Letters Patent is:

1. In combination with a soldering device of the type consisting of a fuel container adapted to rest on a flat surface, a support mounted on the fuel container and containing a combustion chamber and a solder pot secured in the support; a handle member secured to the lower part of the fuel chamber and extending sidewardly therefrom by which the device may be manipulated; a centrally-apertured cover placed over the solder pot; means for clamping the solder pot and the cover to the support; and the cover made concave so that the whole device may be tilted in any direction and at a considerable angle without spilling the solder from the solder pot.

2. In combination with a soldering device of the type consisting of a fuel container adapted to rest on a flat surface, a support mounted on the fuel container and containing a combustion chamber and a solder pot secured in the support; a handle member detachably secured to the lower part of the fuel chamber by which the device may be manipulated; a centrally-apertured cover placed over the solder pot; means for clamping the solder pot and the cover to the support; and the cover made concave so that the whole device may be tilted in any direction and at a considerable angle without spilling the solder from the solder pot; the handle member being attachable to the device either at right angle to the solder pot or parallel with its axis.

3. In combination with a soldering device of the type consisting of a fuel container adapted to rest on a flat surface, a support mounted on the fuel container and containing a combustion chamber and a solder pot secured in the support; a handle member secured to the lower part of the fuel chamber by which the device may be manipulated; a centrally-apertured cover placed over the solder pot; means for clamping the solder pot and the cover to the support; and the cover made concave so that the whole device may be tilted in any direction and at a considerable angle without spilling the solder from the solder pot; the handle member being adjustable to various angles in relation to the solder pot.

MATTHEW KOHOSOFF.